United States Patent [19]
Pyles

[11] Patent Number: 5,051,638
[45] Date of Patent: Sep. 24, 1991

[54] MAGNETICALLY VARIABLE AIR RESISTANCE WHEEL FOR EXERCISE DEVICES

[76] Inventor: Nathan Pyles, 640 Peck Rd., Hilton, N.Y. 14468

[21] Appl. No.: 452,637

[22] Filed: Dec. 19, 1989

[51] Int. Cl.$^5$ .................. H02K 49/00; A63B 21/00; A63B 23/04
[52] U.S. Cl. ........................ 310/105; 272/73
[58] Field of Search .......... 188/165; 272/73, 129, 272/DIG. 6; 310/103, 105, 106, 78

[56] References Cited

U.S. PATENT DOCUMENTS

| | | | |
|---|---|---|---|
| 2,527,237 | 10/1950 | Wilcox, Jr. | 310/105 |
| 3,831,942 | 8/1974 | Del Mar | 310/105 |
| 4,152,617 | 5/1979 | Janson | 310/103 |
| 4,589,656 | 5/1986 | Baldwin | 272/73 |
| 4,709,917 | 12/1987 | Yang | 272/73 |
| 4,752,066 | 6/1988 | Housayama | 272/73 |
| 4,775,145 | 10/1988 | Isuyama | 272/73 |
| 4,826,150 | 5/1989 | Minoura | 272/73 |
| 4,838,544 | 6/1989 | Sasakawa et al. | 272/73 |
| 4,898,379 | 2/1990 | Shiba | 272/73 |

FOREIGN PATENT DOCUMENTS 120015  8/1970  Norway ................. 272/73

Primary Examiner—Steven L. Stephan
Assistant Examiner—D. L. Rebsch

[57] ABSTRACT

A combination air load and magnetic load device applies load to a rotor of an exercise machine. The rotor includes a fan wheel and an eddy current disc. A non-rotating magnet plate faces the eddy current disc and is spaced from it by an air gap. The non-rotating magnet plate includes a circumferential array of permanent magnets, their polarity orientations alternated. The eddy current load is variable by manual or automated control of the air gap between the eddy current disc and the non-rotating magnet plate. The user can reduce the load by increasing the air gap, or increase the load by decreasing the air gap. The rotating fan wheel generates air movement for cooling of operator and equipment, and a corresponding fan load on the rotor. The rotating eddy current disc induces an eddy current load on the rotor.

14 Claims, 8 Drawing Sheets

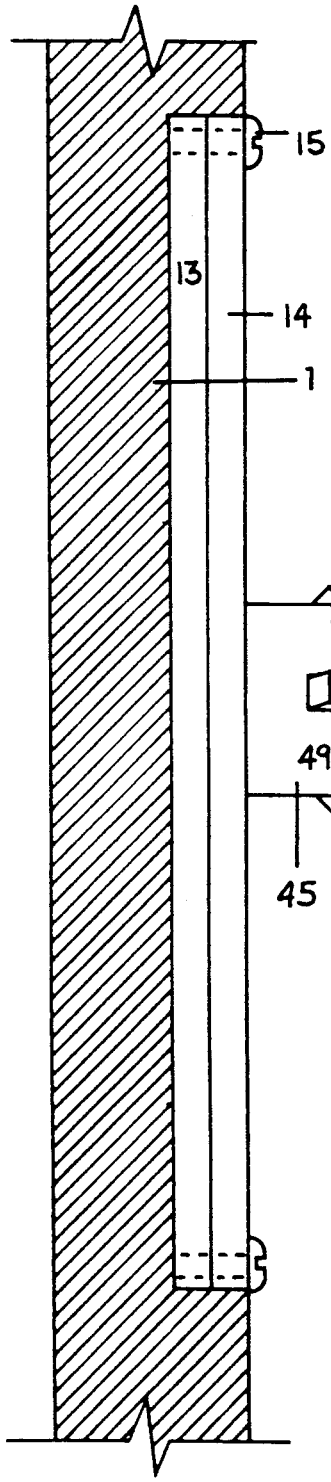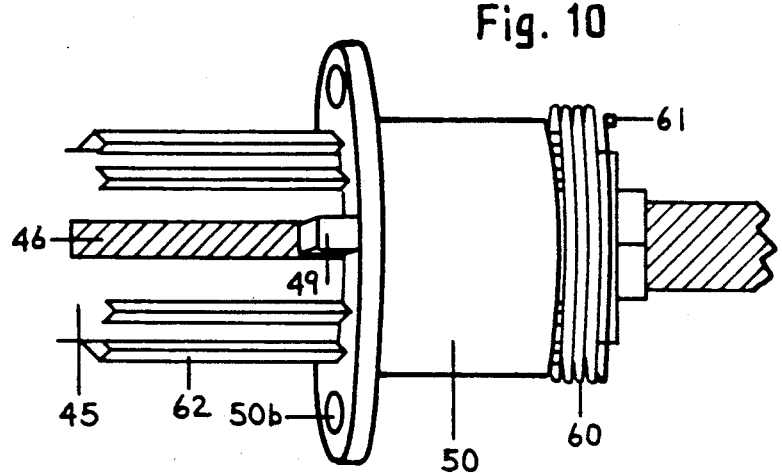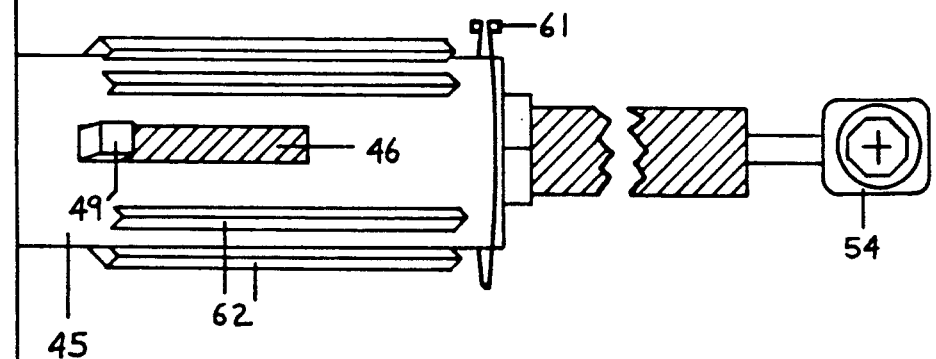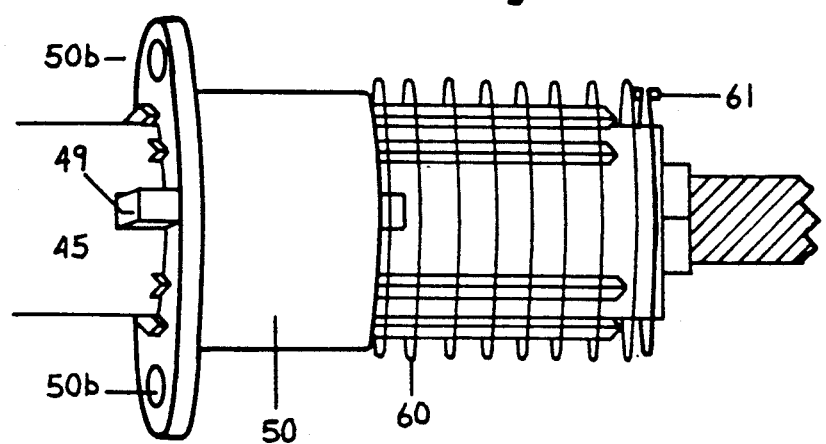

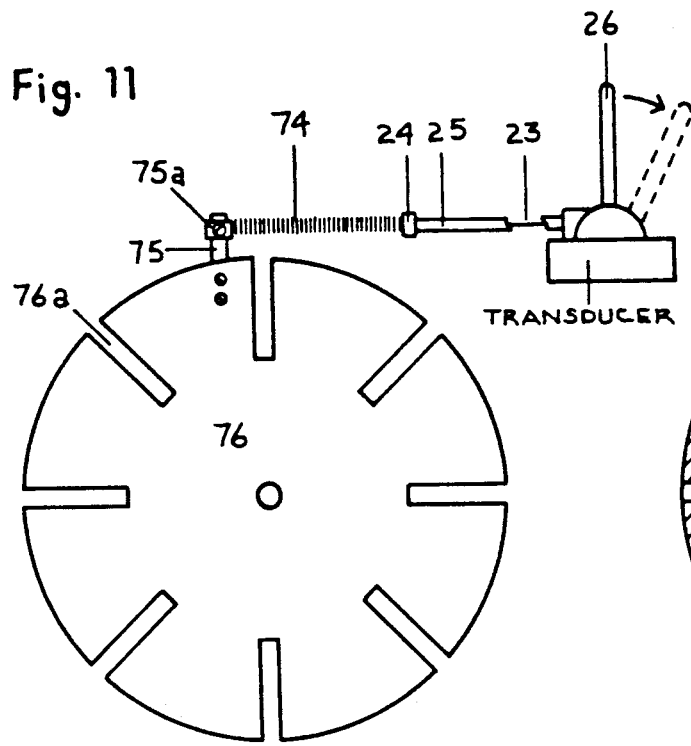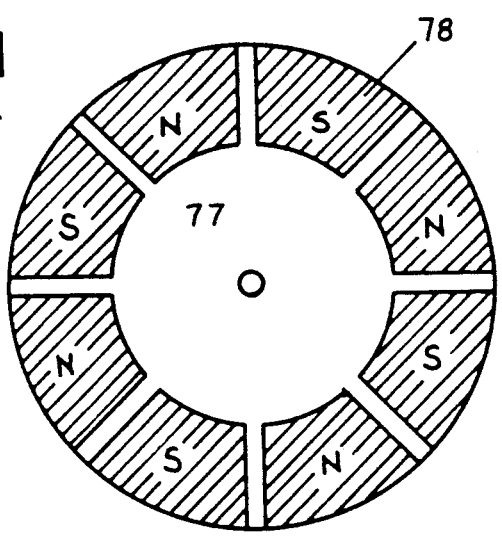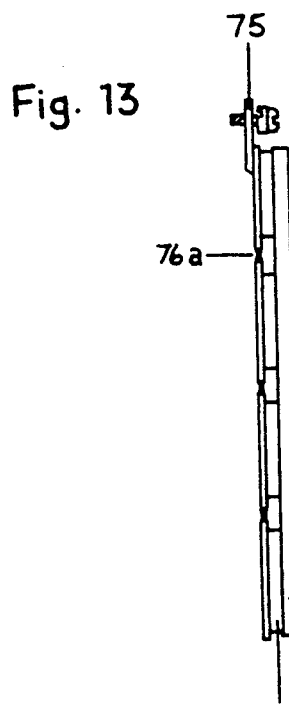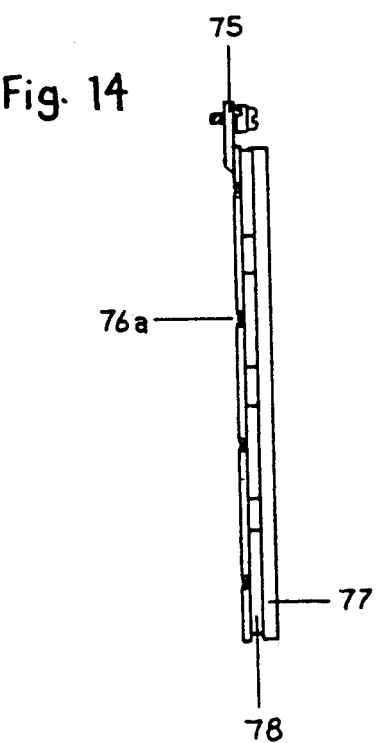

MAGNETICALLY VARIABLE AIR RESISTANCE WHEEL FOR EXERCISE DEVICES

FIELD OF THE INVENTION

This invention relates to exercise equipment, specifically to an improved resistance or load device that can be used in a wide variety of exercise machines including, but not limited to, exercycles, rowers, step machines, ski machines, climbers, resistance machines, and their variations. The resistance device of this invention applies load to a rotating shaft by a combination of air resistance and magnetic resistance.

BACKGROUND INFORMATION

Conventional air load exercise devices presently offer several advantages over friction resistance devices which typically use pads or belts to apply a load. Air load devices offer a smoother resistance by eliminating the need for frictional contact between parts, thus also reducing the number of wearing parts. Air load devices are also simpler to calibrate for workload because of the known exponential relationship between revolutions per minute of the fan wheel and the corresponding load. Air load devices are distinct from all other load applying devices in that a by-product of the user's work is moving air which is effective for cooling. The cooling effect of this self-generated wind greatly enhances the potential work output of the user and also provides a more comfortable environment in which to exercise. By making exercise more comfortable, a user is more likely to workout longer and to continue with a given exercise program.

Conventional air load exercise devices have several deficencies, however. Because load increases with increased rpm of the resistance wheel, the user is restricted to a narrow cadence or stroke speed range. For example, if one user of an air load exercycle wishes to pedal at his normal outdoor cycling cadence of 100 rpm, he would have to work significantly harder than another user of the same machine who chooses to pedal at his normal cadence of 55 rpm. In fact, these two users would not be able to use the same conventional air load exercycle at their respective cadences. Related to this problem is the fact that some air load resistance machines cannot accommodate users of a wide range of physical conditions because of the limited adjustability in load. Athletes who are interested in developing sport-specific muscles should be able to select a cadence or stroke that more accurately replicates the cadence or stroke they use in their sport. A football player using a step machine might want to develop power muscles by working at high load and low speed, while a cross country runner might want to develop endurance muscles by working at lower loads and higher speeds. A conventional air load machine does not accomodate the divergent needs to these two users.

Finally, a conventional air load machine cannot be combined with an interactive microprocessor to vary the load level according to a preprogrammed course or time, or according to the heart rate of the user. An interactive exercise device is often more interesting to use; it pushes the user to higher workout levels; and, when heart rate is one of the input parameters, it provides a more effective and safer workout.

There are several known magnetically variable load exercise devices. These, like the air load devices, are frictionless. Unlike the air load devices, the magnetic devices provide the advantage of a variable load. They however do not provide moving air with its highly desirable cooling effect. Users of the known magnetically loaded devices therefore suffer the output limiting effects of heat stress, and they perform at lower levels than they would be capable of in a cooling environment of moving air.

Some of the magnetically variable load devices use an electromagnet to vary the load. This requires an electrical power source which may not always be convenient to the user. It also adds to complexity and cost of the equipment. Other magnetic variable load devices use small diameter eddy current discs which carry little momentum, and therefore have an uneven pulsating feel, especially at high load levels. Eddy current devices also generate a considerable amount of Joule heat as a by-product of the resistance the magnets provide. The elevated temperature levels of the eddy current discs and nearby magnets can reduce the amount of resistance being applied. The user may experience inconsistent load levels and, when used in ergometric machines, inaccurate readouts of workload levels.

Variable magnetic loading devices are disclosed in U.S. Pat. Nos.: 4,152,617 to Janson; 4,752,066 to Housayama; and 4,775,145 to Tsuyama.

SUMMARY OF THE INVENTION

The present invention is a combination air load and magnetic load device for applying load to a rotor. The rotor includes a fan wheel and an eddy current disc. A non-rotating magnet plate faces the eddy current disc and is spaced from it by an air gap. The non-rotating magnet plate includes a circumferential array of permanent magnets, their polarity orientations alternated. The eddy current load is variable by manual or automated control of the air gap between the eddy current disc and the non-rotating magnet plate. The user can reduce the load by increasing the air gap, or increase the load by decreasing the air gap. The rotating fan wheel generates air movement for cooling of operator and equipment, and a corresponding fan load on the rotor. The rotating eddy current disc induces an eddy current load on the rotor.

It is an object of this invention to provide a magnetically variable air resistance device for applying a widely variable load to a rotating shaft.

Another object is to provide, in such a device, means to preclude chain derailment or large tension slippage when load is varied.

Another object is to provide a magnetically variable load device that will provide, as a by-product of the user's work, the cooling effect of moving air.

Another object is to provide such a device that will apply a measurable, accurate and consistent load.

Another object is to provide such a device without the requirement of an external power source.

Another object is to provide such a device that will provide sufficient momentum for smooth resistance even at high load levels.

Another object is to provide a magnetically variable air resistance device to reduce the need for additional stage gearing because of the combination of air and eddy current load.

Another object is to provide a magnetically variable air resistance device which is quieter than air resistance alone because the base level resistance provided by the eddy current magnet resistance gives the device a higher total load at lower speeds than wind only designs, and therefore permits operation at slower rpm.

Another object is to provide a magnetically variable air resistance device adapted for connection to an microprocessor for automatically load control.

Another object is to provide such a device that can be made smaller than a conventional wind resistance wheel of comparable load level.

Another object is to provide a magnetically variable air resistance device that will inherently dissipate the Joule heat generated by the eddy current resistance.

Further objects, advantages, and features of this invention will become apparent from the following description, given in connection with the accompanying drawings.

DRAWINGS

FIG. 8 is an enlarged detail from FIG. 7 showing the surface of the axle upon which the magnet plate slides.

FIG. 9 is an enlarged detail from FIG. 7 showing the sliding magnet plate collar in its position of maximum resistance.

FIG. 10 is an enlarged detail from FIG. 7 showing the sliding magnet plate collar in its position of minimum resistance.

FIG. 11 is a somewhat schematic axial view of a fourth embodiment of this invention.

FIG. 12 shows the magnets on the stationary magnet plate.

FIG. 13 is a sectional view of the flux gate of FIG. 11 in the position of maximum resistance.

FIG. 14 is a sectional view of the flux gate of FIG. 11 in the position of minimum resistance.

DETAILED DESCRIPTION

Figures 1, 2:
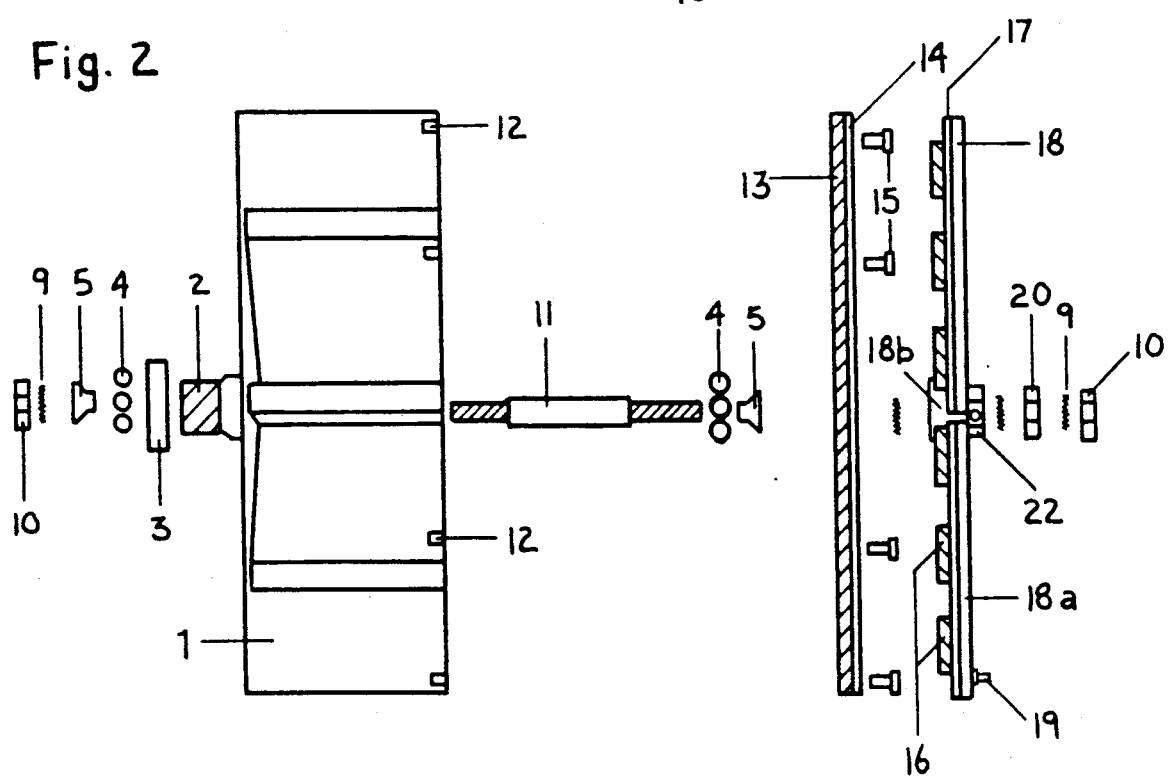
FIG. 1 is a side sectional view of a magnetically variable air resistance wheel according to this invention.
FIG. 2 is an exploded view of the individual components of FIG. 1.

FIG. 1 is a side sectional view of a magnetically variable air resistance wheel according to this invention. FIG. 2 is an exploded view of FIG. 1 which better illustrates the individual parts and their functions. A fan blade wheel 1 is fixed on a steel hub shell 2 which is rotatably supported on each side of the fan wheel by ball bearings 4 which in turn ride on a pair of cones 5 which are non-rotatably fixed to the axle 11. The device is fixed to the frame of an exercise machine by placing the axle 11 into a slotted frame mount (not shown) and securing it with nuts 10 and washers 9 in a well known manner. The device is driven by a chain (not shown) operatively connected to a sprocket 3 which is fixed on the hub shell 2. A pulley may be substituted for the sprocket 3 if a V-belt drive is desired. A ferromagnetic disc 13 and eddy current disc 14 are fastened to the fan blade wheel 1 by suitable screw fasteners 15 threaded into the blades of the wheel 1. The ferromagnetic disc 13 is flat and uniformly spaced relative to the fan wheel 1. The eddy current disc 14 is made of a conductive nonmagnetic material, preferably copper or aluminum.

A magnet plate assembly 18 and 18a is mounted on a magnet plate collar 18b which in turn is non-rotatably fixed on the axle 11. The collar 18b has sufficient axial length (e.g. at least one inch) to insure stable positioning of the magnet plate assembly 18 and 18a on the axle 11. Both the magnet plate 18, 18a and the eddy current disc 14 are thus positioned perpendicular relative to the axle 11. The magnet plate assembly includes a fixed magnet plate 18 and an adjustable magnet plate 18a. The interior surface of these plates 18 and 18a is an annular ferromagnetic backing 17 which acts to concentrate the force of magnets 16 which are secured to its surface.

The chain driven sprocket 3, fan blade wheel 1, ferromagnetic disc 13, and eddy current disc 14 rotate on the axle 11. The magnet plates 18 and 18a remain non-rotating.

Figure 3:
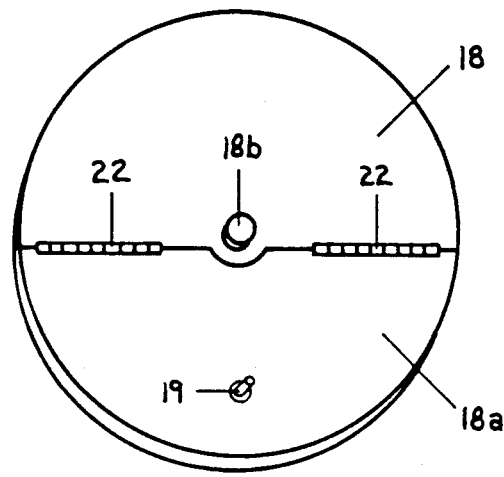
FIG. 3 is a partial view from the right end of FIG. 2.
Figure 4:
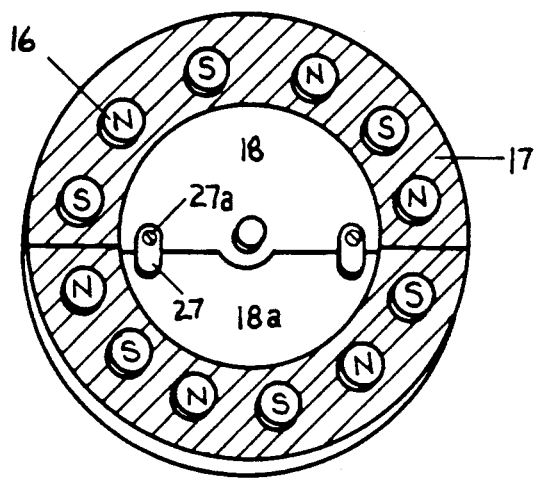
FIG. 4 is an interior axial view indicated by the line 4—4 of FIG. 2.

FIG. 3 is a partial view from the right end of FIG. 2, and shows more detail of the magnet plate assembly 18 and 18a. The adjustable magnet plate 18a pivots away from the vertical plane of the fixed magnet plate 18 on hinges 22. The hinges 22 may be spring loaded where the additional spring force would help return the adjustable magnet plate 18a toward the eddy current disc 14 when cable tension is relaxed (see FIG. 5). The inside surface of the magnet plate assembly 18 and 18a is shown in FIG. 4. This surface faces the eddy current disc 14 and is spaced from it at a fixed distance approximately equal to the thickness of the eddy current disc 14. An annular ferromagnetic backing 17 is fixed to the magnet plates 18 and 18a. The magnets 16 are secured to the backing 17 in an alternating north-south pattern as indicated in FIG. 4. Plate stops 27 are secured to the fixed magnet plate 18 with fasteners 27a to prevent the adjustable magnet plate 18a from moving beyond the plane of the fixed magnet plate 18 in the direction of the eddy current disc 14. In this embodiment the fixed magnet plate 18 is sufficiently thick and rigid to prevent deflection or warpage when the adjustable magnet plate 18a is pivoted away from its vertical plane. Accurate positioning of the magnet plates is essential for assuring the accuracy of the workload. The magnet plate axle collar 18b connects the fixed magnet plate 18 to the axle. A user operated shift lever 26, shown in FIG. 5, is operatively connected to the adjustable magnet plate section 18a by means of a cable 23 at a cable anchor point 19.

Figure 5:
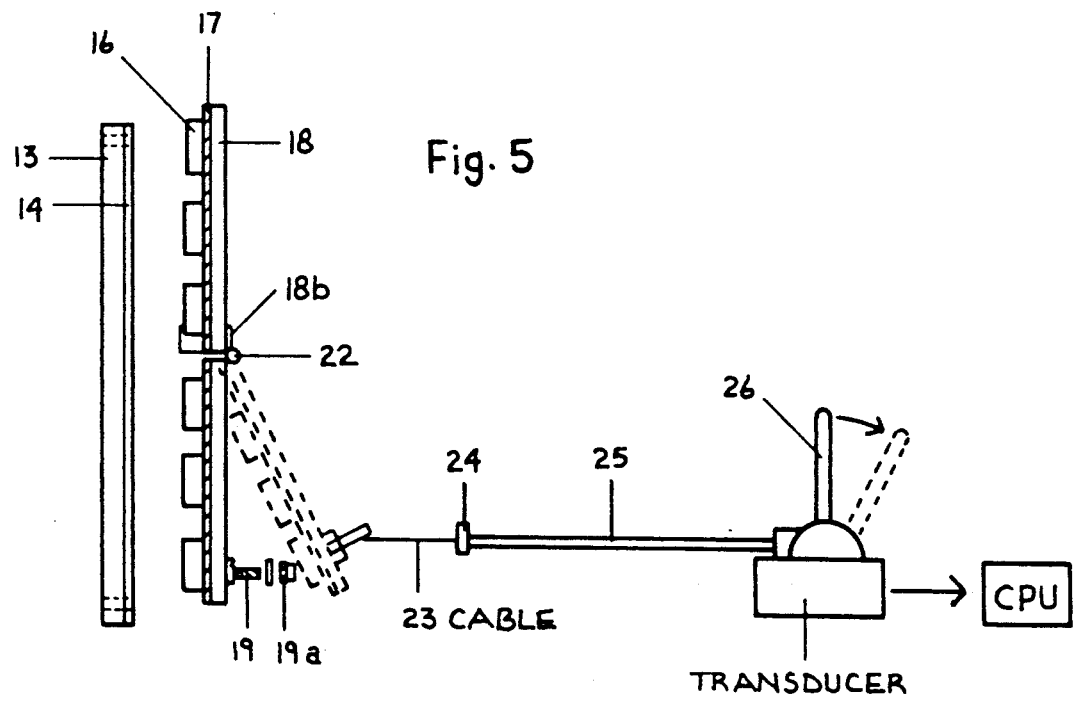
FIG. 5 is a detail view showing part of the mechanism in operation.

FIG. 5 shows a manually variable resistance embodiment in which a shift lever 26 with an integral transducer sends positional information to a CPU. The shift lever 26 has detents to set the cable tension at a series of preset positions. The shift lever 26 is connected to the adjustable magnet plate 18a through a cable 23 extending through a cable housing 25 on the frame of the exercise machine. The cable 23 attaches to the adjustable magnet plate 18a by a suitable connector at the cable anchor 19. When the user pulls down on the shift lever 26, the cable 23 pulls the adjustable magnet plate 18a away from the eddy current disc 14. The increase in the size of the air gap reduces the magnetic force acting on the eddy current disc 14. As the shift lever 26 is pulled down the transducer sends a signal to the CPU indicating the position of adjustable magnet plate 18a. This information, along with the fan blade rpm information which is sent to the CPU by an rpm sensor, is used to calculate and display workload levels. When the shift lever 26 is pushed forward, the cable 23 tension is relaxed and the adjustable magnet plate 18a moves toward the surface of the eddy current disc 14. Again the transducer sends a signal to the CPU indicating the new position of the adjustable magnet plate 18a. The adjustable magnet plate 18a will return to a position nearer the eddy current disc 14 because of the magnetic force between the magnets 16 and the ferromagnetic disc 13.

If the magnetic force is insufficient to insure full return of the adjustable magnet plate 18a to the vertical plane of the fixed magnet plate 18, the force of gravity may be employed simply by arranging the device so that the hinges 22 are parallel with the ground with the fixed magnet plate 18 extending upward from the hinges. The weight of the adjustable magnet plate 18a will then assist the plate in its return to a position of greater resistance. This configuration of the device is preferred. If for some reason another configuration is desired, or the return of the adjustable magnet plate 18a is not reliable, then the hinges 22 may be spring loaded in the direction that will assist in the return of the adjustable magnet plate 18a. These arrangements are preferred because of the economy of fewer parts and the reliability of simplicity of operation. It should also be noted that this variable tension arrangement permits the user to vary the load without dismounting the machine, and in fact the load can be varied while using the machine without the risk of chain or belt derailment, which is a possibility with devices that use discrete gears or a variable pulley to alter the load.

Figure 6:
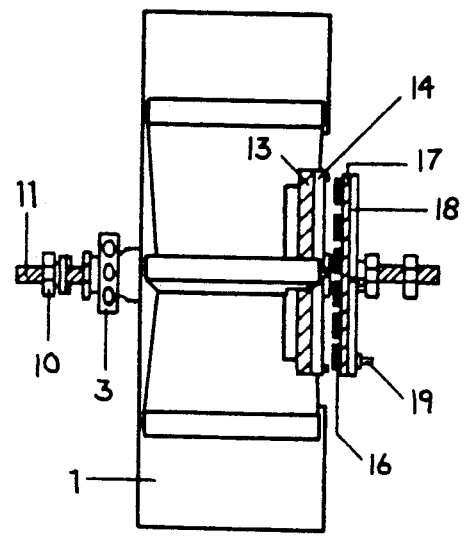
FIG. 6 is a side sectional view of a second embodiment of this invention.

FIG. 6 shows a second embodiment of this invention in which a ferromagnetic disc 13 and eddy current disc 14 are set in a recess of the fan blade wheel 1. A magnet plate assembly 18 and 18a is similar to that in FIGS. 1-5, though smaller in relation to the fan blade wheel 1.

Figure 7:
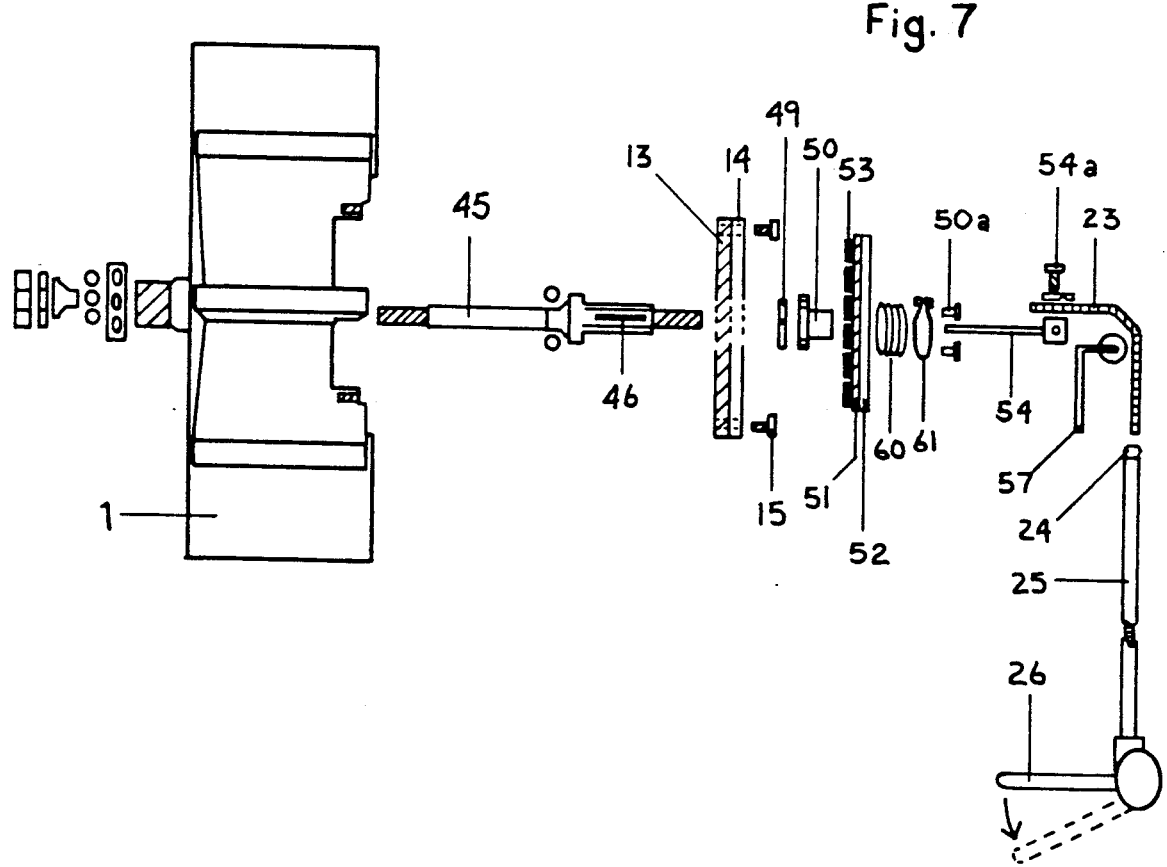
FIG. 7 is an exploded view of a third embodiment of this invention.

FIG. 7 shows a third embodiment of this invention, in which a slide plate 52 replaces the adjustable magnet plate assembly 18 and 18a of FIGS. 1-6. The slide plate 52 includes an annular ferromagnetic backing 51 with a circular array of magnets 53 arranged with poles alternating north and south. The slide plate 52 is fixed to a self-lubricating nylon slide plate collar 50 by fasteners 50a. An axle 45 includes a keyway 46 for an axle key 49 to fix the slide plate collar to the axle 45. A pull rod 54 slides through the hollow end of the axle 45, threads into the center of the axle key 49, and is attached to the cable 23. Cable 23 is operated with the same type of shift lever 26 described in connection with FIG. 5. A cable pulley 57 is secured to the frame to permit the necessary turn of the cable 23. Spring 60 urges the slide plate 52 back to a position near the eddy current disc 14 when cable tension is relaxed. A snap ring 61 acts as a stop for the spring 60, to secure the slide plate 52 on the axle 45.

FIG. 8 is a detail of the slide plate embodiment showing the section of the axle 54 upon which the slide plate 51 and collar 50 slides. The splines 62 act as a guide for the slide plate collar 50 and help limit free play in the slide plate 51. FIG. 9 shows the slide plate collar 50 in the position of maximum load when the cable is untensioned and the axle key 49 is all the way in. FIG. 10 shows the slide plate collar 50 in the position of minimum load when the cable is tensioned and the axle key 49 is slid all the way out, and pulling with it the slide plate collar 50 and the slide plate 51.

FIGS. 11, 12, 13, and 14 show a fourth embodiment of this device where the magnet plate 77 remains stationary and load is changed by varying the position of a flux gate 76 which has gaps 76a equal in size to the gaps between magnets 78, shaped as shown. The shift lever 26 changes the position of the flux gate 76 by turning it a small amount on an axis parallel with the magnet plate 77. The cable 23 from the shift lever 26 connects to the flux gate 76 at the flux gate arm 75. Spring 74 urges the gate 76 back when cable tension is relaxed. The flux gate works by "short circuiting" the magnetic field. FIG. 13 shows the position of the flux gate gap 76a that will provide maximum load. The magnets are unaffected by the flux gate, and the magnetic force is full. FIG. 14 shows the position of the flux gate gap 76a that will provide minimum load. Half of each magnet is "shorted", minimizing the magnetic field. Positions of the flux gate between these two extremes provide incremental variability in the resistance level.

Figure 15:
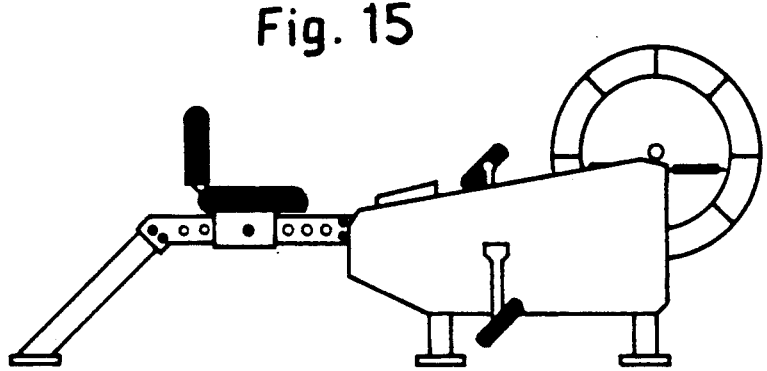
FIGS. 15-18 show the magnetically variable air resistance wheel of this invention as used in, respectively, a recumbant exercycle device, a rowing machine device, a step machine device, and a ski machine device.
Figure 16:
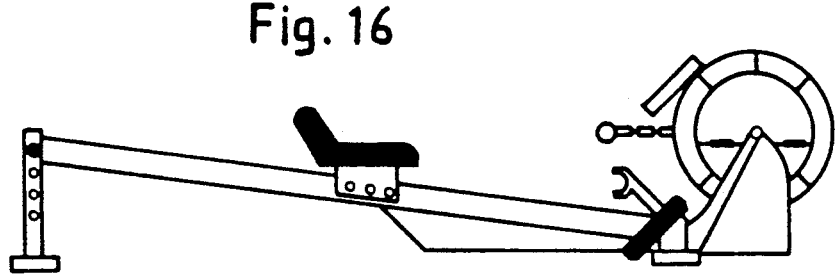
Figure 17:
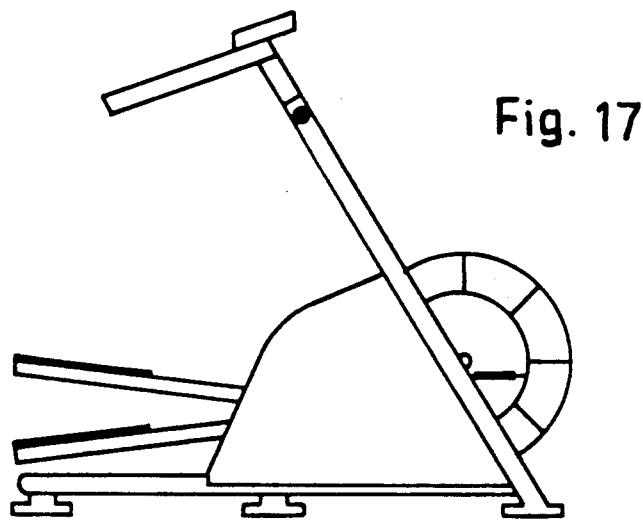
Figure 18:
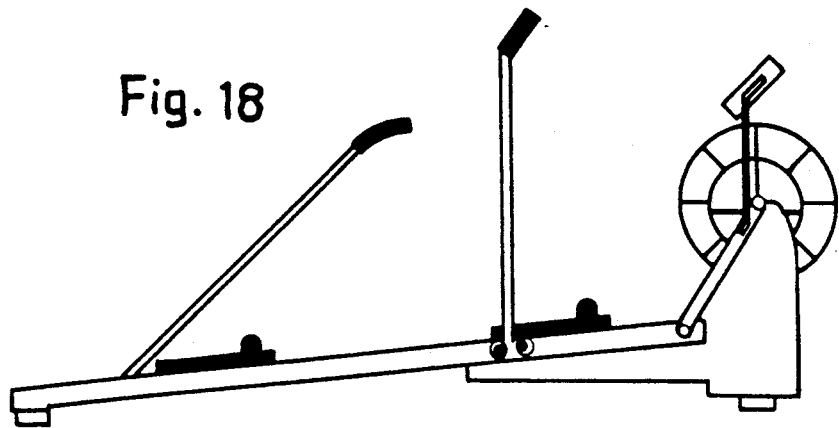

FIG. 15 shows this invention used in a recumbent exercycle ergometer. FIG. 16 shows its use in a rowing machine. FIG. 17 shows its use in a step machine. FIG. 18 shows its use in a ski machine.

Figure 19:
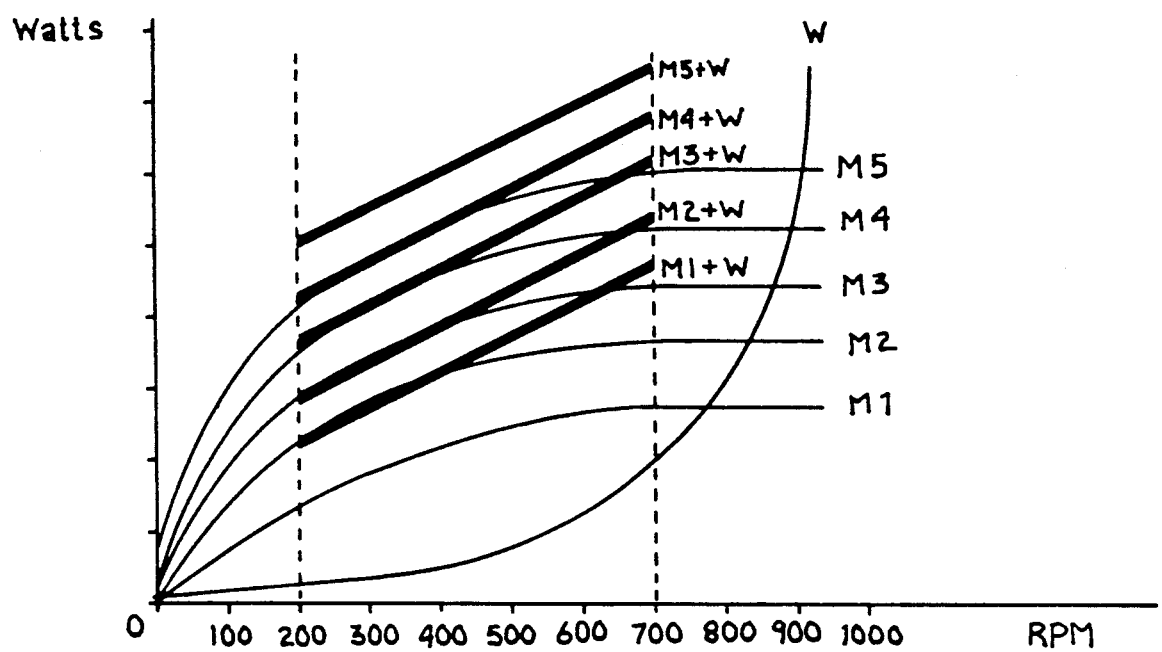
FIG. 19 is a graph showing the summation of variable magnetic resistance and air resistance in the relevant range of use.

FIG. 19 shows the summation of the load that is applied by the two different means of resistance, the air resistance (W) and the magnet resistance at different magnet positions (M1 to M5). The summation of these loads is represented in the relevant range by lines M1+W through M5+W. The detents in the shift lever 26 are spaced to provide equal percentage changes in the resistance level for each position selected. For example, if a five position shift lever is used, then moving the lever from position 5 to position 4 might reduce the amount of resistance being provided by the adjustable magnet plate segment of the device by 20%. Moving the lever to the next lower detent, position 3, would reduce the amount of resistance being provided by the adjustable magnet plate segment of the device by another 20%, for a total reduction in magnet plate resistance of 40%. It should be noted that these percentages do not represent nearly as large reductions in the total load because the load from the fan blade wheel 1 and the fixed magnet plate section 18 has remained constant. The load figure at different adjustable magnet postions is determined with the use of a dynamometer.

Figure 20:
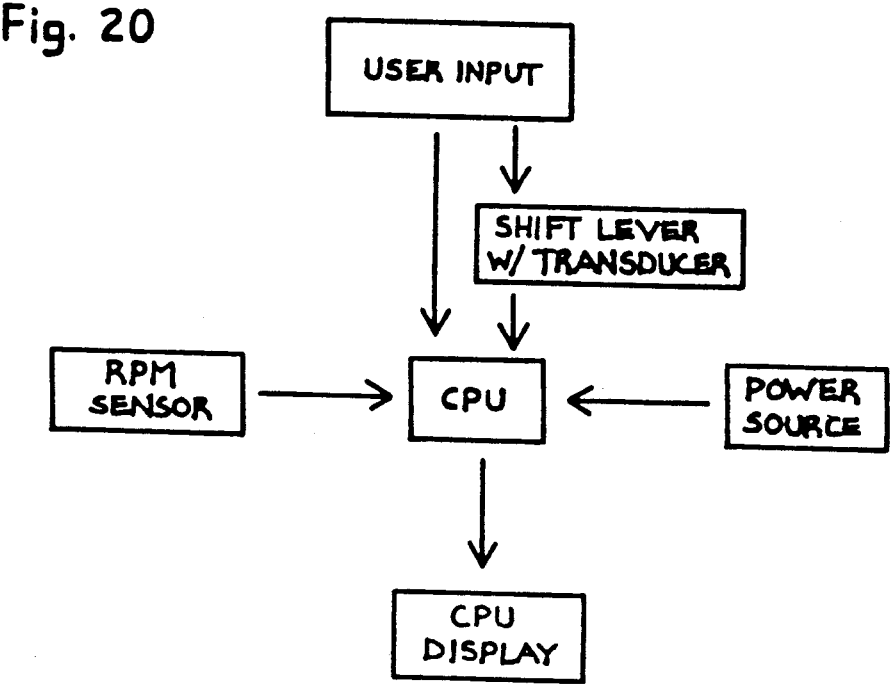
FIG. 20 is a block diagram of a load measuring and microprocessing device combined with the manually adjusted load embodiment of this invention.

FIG. 20 is a block diagram of a load measuring and microprocessing device combined with the manually adjusted load embodiment of this invention. User input is keyed into the CPU, the shift lever transducer sends a magnet postion signal to the CPU and a magnetic RPM sensor counts wheel RPM and sends this information to the CPU. From this information the CPU calculates and displays accurate work load levels.

Figure 21:
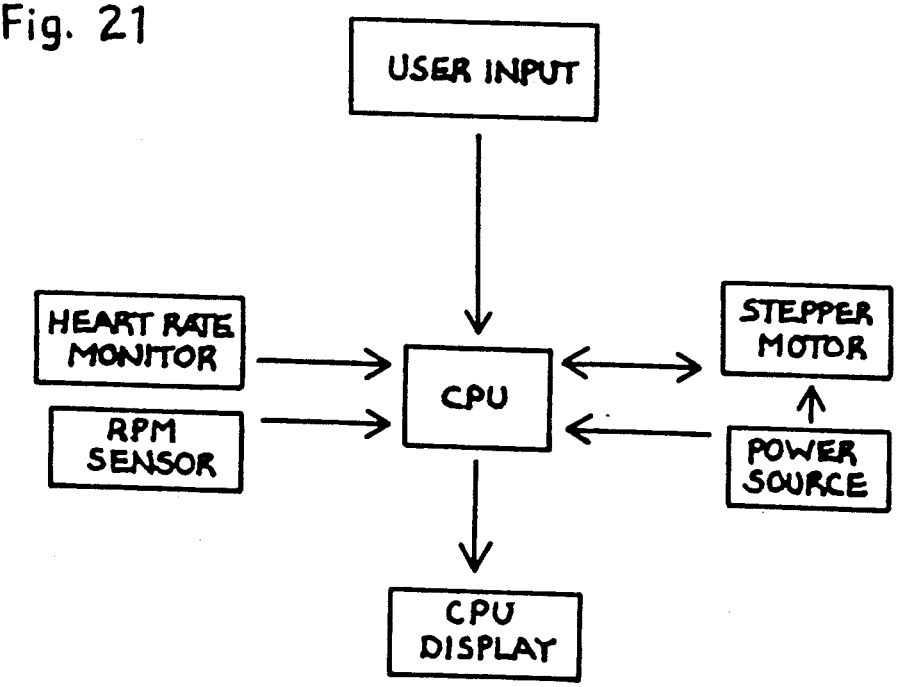
FIG. 21 is a block diagram of a load measuring and microprocessing device used with the interactive microprocessor adjusted load embodiment of this invention.

FIG. 21 is a block diagram of a load measuring and microprocessing device used in the interactive microprocessor adjusted load embodiment of this invention. In this embodiment the user has the option of entering a particular load level, or choosing a preprogrammed course, a target work-load level, or a target heart range, and the CPU will then vary the work-load by sending a signal to a stepper motor that will shift the position of the adjustable magnet plate.

CONCLUSION

Because the magnetically variable air resistance wheel avoids any frictional contact in the load applying method, users will find the resistance exceptionally smooth. Also, by avoiding frictional contact this device can operate under heavy use with minimal maintenance. Yet this device offers several advantages over conventional wind only resistance devices including, the ability to select pedal or step cadences, the ability to develop specific type of muscles (fast vs. slow twitch fibers), and greater load level range so users at various level of conditioning can use the same machine. This device also has several advantages over magnetic only resistance devices including the cooling effect of self-generated air turbulence, and a smoother resistance at high load levels because of the greater momentum of the fan wheel. Other advantages of this device will be apparent to those skilled in the art without departing from the spirit and scope of the claims.

While the above description includes many specific details, these should not be construed as limitations on the scope of the invention, but only as examples of preferred embodiments thereof. Those skilled in the art will envision many other possibile variations that are within its scope. For example, there may be two or more segments of the magnet plate that are adjustable to provide even greater variabilty in the resistance level. The magnetic resistance portion of this device might be completely fixed, so as to apply a base load on a wind resistance wheel and thus avoid the need of a second stage drive. Such a fixed design could also be used to scale down the size of a wind resistance wheel to make a more compact exercise machine, or to make the wind resistance wheel quieter by operating at a lower speed. The position of the magnets and the eddy current resistance disc, and the means for varying the magnet position, might be varied any number of ways. For example, the fan wheel might be constructed so the blades are shorter and wider and the wheel itself looks like a horizontal tube. In this variation the eddy current resistance portion could be on a segment of the outer or inner portion of the wheel rim, and the magnets arranged in a tube that covers or fits inside this same segment of the wheel, with the variability coming from shifting the magnet tube over a larger area of the eddy current resistance portion of the wheel. Accordingly, the scope of the invention is limited only by the appended claims.

What is claimed is:

1. A load applying system for an exercise device, including:
    a manually operable rotor including an integral fan wheel and a first load disc;
    a non-rotatable second load disc mounted adjacent to said first load disc;
    one of said load discs including a ferromagnetic layer and a nonmagnetic conductive layer; and
    the other of said load discs including a plurality of magnets;
    whereby the rotation of said rotor is effective to generate a fan load on said rotor and a corresponding air movement from said fan wheel for cooling of operator and equipment, and to induce an eddy current load on said rotor.

2. A load applying system as defined in claim 1, wherein said first load disc includes said ferromagnetic layer and said nonmagnetic conductive layer; and said second load disc includes said magnets.

3. A load applying system as defined in claim 2, wherein said second load disc includes a stationary segment and an adjustable segment pivotally movable relative to said stationary segment; said system further including:
    load adjustment means to move said adjustable segment to vary the air gap between said adjustable segment and said first load disc, thereby to vary said eddy current load on said rotor.

4. A load applying system as defined in claim 2, further including: load adjustment means to move said second load disc axially relative to said first load disc to vary the air gap between said discs, thereby to vary said eddy current load on said rotor.

5. A load applying system as defined in claim 2, wherein said second load disc includes an annular ferromagnetic layer under said magnets to concentrate and amplify the magnetic force thereof.

6. A load applying system as defined in claim 1, wherein said first load disc includes said magnets and said second load disc includes said ferromagnetic layer and said nonmagnetic conductive layer.

7. A load applying device as set forth in claim 3, said load adjustment means including a transducer responsive to the position of said adjustable segment and the speed of said rotor to relay positional and speed information to a microprocessor for calculation and display of workload level corresponding to said position and speed.

8. A load applying device as set forth in claim 3 wherein the position of said adjustable segment is variable by means of user selected control programs which send positional information to a motor to shift the position of said adjustable segment.

9. A load applying system for an exercise device, including: a manually operable rotor comprising a single rotor wheel which is a combination (i) fan wheel to generate air movement for cooling of operator and equipment, and (ii) eddy current disc to conduct an electrical eddy current; and
    magnetic means to induce an electrical eddy current in said eddy current disc;
    whereby the rotation of said rotor is effective to generate a fan load on said rotor and a corresponding air movement from said fan wheel for cooling of operator and equipment, and to generate an eddy current load on said rotor.

10. A load applying system as defined in claim 9, further including means to vary said eddy current, thereby to vary said eddy current load on said rotor.

11. A load applying system for an exercise device, including:
    a manually operable rotor including an integral fan wheel and a first load member;
    a non-rotatable second load member mounted adjacent to said first load member;
    one of said load members including a ferromagnetic layer and a nonmagnetic conductive layer; and
    the other of said load members including a plurality of magnets;
    whereby the rotation of said rotor is effective to generate a fan load on said rotor and a corresponding air movement from said fan wheel for cooling of operator and equipment, and to induce an eddy current load on said rotor.

12. A load applying system as defined in claim 11, wherein said first load member includes said ferromagnetic layer and said nonmagnetic conductive layer; and said second load member includes said magnets.

13. A load applying system as defined in claim 12, wherein said second load member includes a stationary segment and an adjustable segment pivotally movable relative to said stationary segment; said system further including:

load adjustment means to move said adjustable segment to vary the air gap between said adjustable segment and said first load member, thereby to vary said eddy current load on said rotor.

14. A load applying system as defined in claim 12, further including:

load adjustment means to move said second load member axially relative to said first load member to vary the air gap between said members, thereby to vary said eddy current load on said rotor.

* * * * *